US012059926B2

(12) United States Patent
Vogt et al.

(10) Patent No.: US 12,059,926 B2
(45) Date of Patent: Aug. 13, 2024

(54) INSERT ELEMENT FOR A VEHICLE WHEEL AND VEHICLE WHEEL WITH AT LEAST ONE SUCH INSERT ELEMENT

(71) Applicants: OTTO FUCHS—KOMMANDITGESELLSCHAFT, Meinzerhagen (DE); JORDAN SPRITZGUSSTECHNIK GMBH, Iserlohn (DE)

(72) Inventors: Sebastian Vogt, Lüdenscheid (DE); Michael Risse, Menden (DE); Andreas Erdmann, Menden (DE); Sven Chandra Bose, Meinerzhagen (DE); Tobias Peter, Meinerzhagen (DE); Thomas Timmermann, Meinerzhagen (DE); Andreas Nowack, Meinerzhagen (DE)

(73) Assignee: OTTO FUCHS KOMMANDITGESELLSCHAFT, Meinzerhagen (DE)

( * ) Notice: Subject to any disclaimer, the term of this patent is extended or adjusted under 35 U.S.C. 154(b) by 420 days.

(21) Appl. No.: 17/435,164

(22) PCT Filed: Mar. 19, 2020

(86) PCT No.: PCT/EP2020/057639
§ 371 (c)(1),
(2) Date: Aug. 31, 2021

(87) PCT Pub. No.: WO2020/207744
PCT Pub. Date: Oct. 15, 2020

(65) Prior Publication Data
US 2022/0134802 A1 May 5, 2022

(30) Foreign Application Priority Data
Apr. 9, 2019 (DE) ...................... 10 2019 109 336.8

(51) Int. Cl.
*B60B 7/04* (2006.01)
*B60B 7/06* (2006.01)

(52) U.S. Cl.
CPC ................ *B60B 7/04* (2013.01); *B60B 7/065* (2013.01); *B60B 2310/307* (2013.01)

(58) Field of Classification Search
CPC .. B60B 7/04; B60B 7/06; B60B 7/065; B60B 7/08
See application file for complete search history.

(56) References Cited

U.S. PATENT DOCUMENTS

| | | | | |
|---|---|---|---|---|
| 3,894,775 A | * | 7/1975 | Christoph | ............... B60B 7/068 301/37.35 |
| 8,342,613 B2 | * | 1/2013 | Russell | ..................... B60B 5/02 301/37.12 |

(Continued)

FOREIGN PATENT DOCUMENTS

| | | |
|---|---|---|
| CN | 101318445 A | 12/2008 |
| CN | 101378914 A | 3/2009 |

(Continued)

OTHER PUBLICATIONS

International Search Report dated Oct. 15, 2020 in parent International application PCT/EP2020/057639.

(Continued)

*Primary Examiner* — S. Joseph Morano
*Assistant Examiner* — Emily G. Castonguay
(74) *Attorney, Agent, or Firm* — Polson Intellectual Property Law P.C.; Margaret Polson; Christopher Sylvain

(57) ABSTRACT

An insert element for a vehicle wheel comprises several supporting bodies for supporting the insert element on supporting surfaces of the vehicle wheel. The supporting bodies have a supporting shoulder, which can be brought to bear against a supporting surface of the vehicle wheel, and (Continued)

a fastening extension with an axial hollow channel and with at least one outwardly protruding locking projection, arranged at an axial distance from the supporting shoulder, for engaging behind an installation opening reaching through the supporting surface of the vehicle wheel. The supporting bodies are designed as elastomer components which are elastically deformable in the radial and axial direction and sit with their hollow channel on a supporting core. The supporting cores bear a radially protruding retaining flange and are held on the rear side on the insert element. Each supporting body is held by the retaining flange in a form-fitting manner against being pulled off from the supporting core.

17 Claims, 4 Drawing Sheets

(56) References Cited

U.S. PATENT DOCUMENTS

| | | | | |
|---|---|---|---|---|
| 2012/0013170 A1* | 1/2012 | Renius | | B60B 7/00 |
| | | | | 301/37.102 |
| 2012/0133197 A1* | 5/2012 | Mengle | | B60B 7/04 |
| | | | | 301/37.107 |
| 2016/0243891 A1* | 8/2016 | Dominguez Martinez | | |
| | | | | B60B 7/065 |
| 2016/0288564 A1* | 10/2016 | Ishikawa | | B60B 7/063 |
| 2018/0056714 A1* | 3/2018 | Maji | | B60B 7/06 |

FOREIGN PATENT DOCUMENTS

| | | |
|---|---|---|
| CN | 108569083 A | 9/2018 |
| DE | 202018106318 U1 | 1/2019 |
| FR | 2855457 A1 | 12/2004 |
| FR | 3065397 A1 | 10/2018 |
| JP | 2001219703 A | 8/2001 |
| KR | 20050034673 A | 4/2005 |

OTHER PUBLICATIONS

Written Opinion of the International Searching Authority dated Oct. 15, 2020 in parent International application PCT/EP2020/057639.
Examination report dated May 31, 2024 in related Chinese application No. 202080025779.6.

* cited by examiner

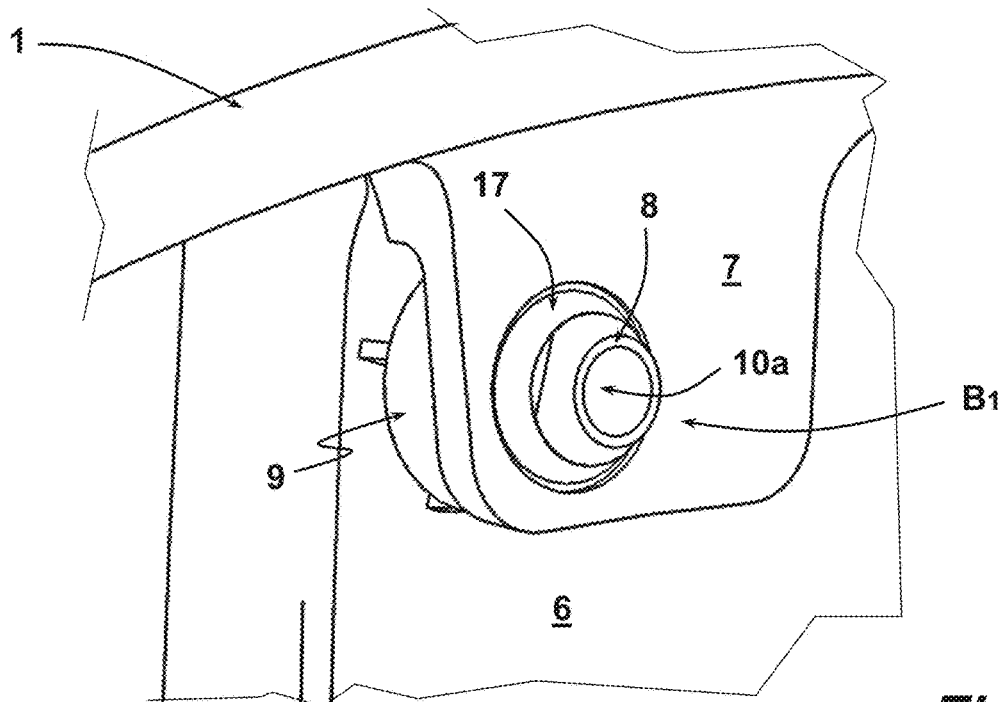
*Fig. 3*
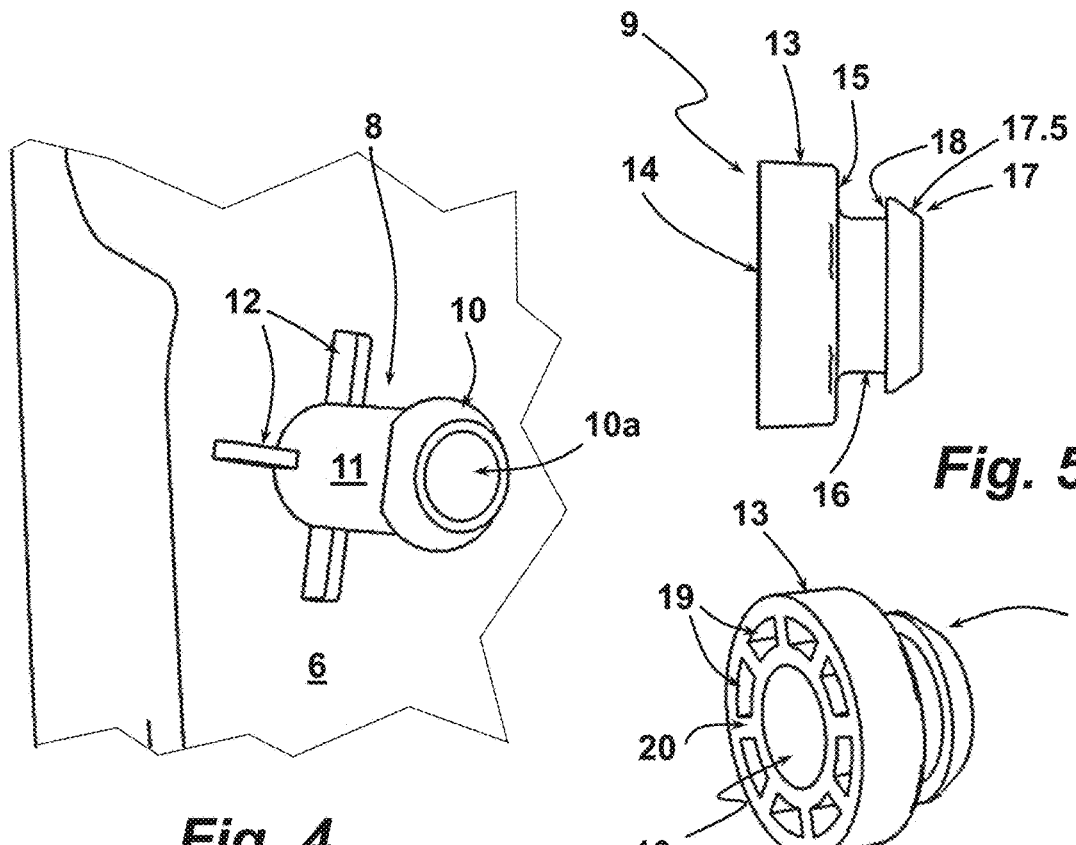
*Fig. 4*
*Fig. 5a*
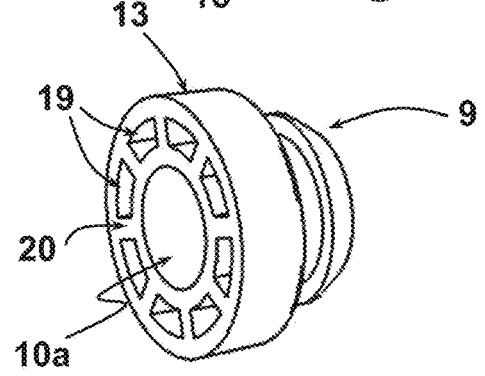
*Fig. 5b*

INSERT ELEMENT FOR A VEHICLE WHEEL AND VEHICLE WHEEL WITH AT LEAST ONE SUCH INSERT ELEMENT

BACKGROUND

The subject matter of the present disclosure is an insert element for a vehicle wheel, in particular a light metal wheel, with several supporting bodies arranged at an axial distance from one another on the rear side on the insert element for bracing the insert element installed on the vehicle wheel on supporting surfaces of the vehicle wheel, wherein the supporting bodies have a supporting shoulder which can be brought to bear against a supporting surface of the vehicle wheel and a fastening extension with an axial hollow channel and with at least one outwardly protruding locking projection, arranged at an axial distance from the supporting shoulder, for engaging behind an installation opening reaching through the supporting surface of the vehicle wheel. Furthermore, a vehicle wheel with at least one such insert element is described.

Light metal vehicle wheels are designed in many cases as spoked wheels. The spokes connect the hub mount bearing the wheel stud bores to the rim. Between the spokes, spoke openings are arranged. Such a spoke can also be formed from two or more spoke segments. Such light metal wheels exist in different designs. Here they are cast wheels or forged wheels.

Such vehicle wheels are produced and offered in different variants not only with regard to their wheel form but also with regard to their coloring. The coloring usually takes place by painting certain surfaces or surface regions of the wheel. According to another possibility for a colored design of such a wheel, a spoke insert made of plastic is inserted in the spoke openings as wheel appliqué. These spoke inserts can be of the same color as the light metal wheel or of another color. In this manner, without having to paint the vehicle wheel, this vehicle wheel can be provided multiple colors. Such spoke inserts can also be designed to completely or partially cover spoke openings, in order to reduce the flow resistance coefficient of the vehicle wheel by means of such wheel appliqués. It is precisely for this purpose that such spoke inserts are available, since, by means of them, with clearly reduced weight, the flow resistance coefficient can be reduced in comparison to a vehicle wheel in which the surfaces in question are formed by the light metal.

In vehicle wheels, plastic applique parts in the form of hub caps are also used. They are attached in the axial bore of the wheel by a snap connection. However, in contrast to the above-described spoke inserts, these plastic appliqué parts are not exposed to centrifugal forces. The centrifugal forces occurring when the vehicle wheel is rotated and acting on a spoke insert are not negligible. The spoke insert therefore must be fastened on the vehicle wheel in such a manner that there is no risk of the spoke insert loosening. For this purpose, such a spoke insert has multiple, for example, three, supporting bodies protruding on the rear side, arranged at a distance from one another. In each supporting body, a threaded bushing made of metal is inserted. The vehicle wheel has complementary supporting surfaces, on which the supporting bodies can be brought to bear during the installation of such a spoke insert. The supporting surfaces have a respective bore, in order to provide access to the threaded bushings located in the supporting bodies of such a spoke insert from the rear side of the wheel. Such a spoke insert is usually fastened by means of screws which are installed from the rear side of the wheel. Said screws pass through the installation opening, typically implemented as an installation bore and passing through the supporting surfaces, and they are secured by means of their threaded shaft in the threaded bushings of a respective supporting body. So that such a screw connection does not automatically loosen, in many cases, with the threaded bushings, titanium screws provided with screw securing media are commonly used. As a result of this pairing of materials, corrosion is prevented. In fact, in this way, such a spoke insert is permanently fastened securely on the vehicle wheel. However, the screws required for this purpose are expensive. If each spoke insert is held on the vehicle wheel by three screw fasteners and such a wheel bears five such inserts, 15 screws are necessary. Thus, the use of material for fastening the insert elements per vehicle wheel is quite high, which moreover has a disadvantageous effect on the weight of the vehicle wheel. Due to the use of screws, such an insert can be loosened again for the purpose of repair or readjustment.

Tests have been carried out in order to connect such spoke inserts by clip-on connections to a light metal wheel having spokes, namely by forming locking fingers protruding on the rear side from the spoke insert and engaging behind the rear side of the spokes facing the vehicle. However, particularly in cast wheels, the problem associated with clipping the spokes from the rear is that a relatively high tolerance of the spoke thickness, thus the extension of such a spoke in axial direction, must be accepted. This tolerance resulting from tool wear is considerable and can be 1 to 1.5 mm. This tolerance cannot be compensated for using conventional clip-on connections, in particular if, at the same time, a permanent play- and thus rattle-free and secure connection is to be ensured.

From DE 20 2018 106 318 U1, a spoke insert for a vehicle wheel having the features of the type mentioned above at the start is known. In this previously disclosed insert element referred to as spoke insert, supporting bodies are formed on the rear side thereof. The supporting bodies have a formed fastening extension, by which the spoke insert is fastened on the vehicle wheel. The fastening extension has a supporting shoulder and a locking projection spaced therefrom. The locking projection is used for engaging behind a wheel-side installation opening implemented as bore, so that the marginal regions facing the insert element are supported on the supporting shoulder, while the locking projection engages behind the installation bore. The fastening extension itself has at least one gap according to its longitudinal extension, so that a diameter reduction in the region of its locking projection is possible, in order to be able to push said locking projection through the installation bore, before it relaxes on the rear side of the installation bore, so that the spoke insert is firmly secured in a form-fitting manner in axial direction in or on such an installation bore. Typically, such a spoke insert bears several such supporting bodies. The supporting bodies are formed on the insert element, consisting therefore of the same hard plastic material as the insert element which is also typically a plastic part.

In this previously disclosed spoke insert, it is advantageous that screws or other fasteners to be set with a tool are not necessary and that installation of the insert element occurs from only one side of the vehicle wheel, typically the visible side.

Even if in this previously disclosed spoke insert, installation on the vehicle wheel is simplified, a rattle-free seating of the insert elements cannot be guaranteed. Moreover, limitations exist with regard to a compensation in axial direction, which is necessary due to manufacturing tolerances. Moreover, with such an insert element, the desired pretensioning force can sometimes not be achieved. As axial compensation element, a foam rubber ring or a silicone ring implemented as O-ring is used, resulting in the axial pretensioning force. A defined seating of the insert element on the spoke flanks or the wheel disc is however not present. A defined junction, for example, by way of a gap between such an insert element and the vehicle wheel, is dependent on the tolerance situations of insert element and vehicle wheel.

SUMMARY

Proceeding from this background, an aspect of the present disclosure is to further develop an insert element for a vehicle wheel, of the type mentioned at the start, in such a manner that the above-mentioned disadvantages are reduced, if not eliminated.

This is achieved according to the present disclosure by an insert element of the type mentioned at the start, wherein the supporting bodies are implemented as elastomer components which are elastically deformable in radial and axial direction and sit with their hollow channel on a supporting core, which supporting cores bear a radially protruding retaining flange and are held on the rear side on the insert element, wherein each supporting body is held by the retaining flange of the supporting core bearing it in a form-fitting manner against being pulled off from the supporting core.

In this insert element, the supporting bodies are designed as elastomer components. Said supporting bodies are elastic both in radial direction and in axial direction, at least in their sections which border the hole marginal regions of an installation opening, typically designed as installation bore, of the vehicle wheel. Due to this constitution of the supporting bodies designed as elastomer components, it is possible to compensate not only for tolerances with regard to the arrangement of the installation bores on the vehicle wheel and the arrangement of the elastomer components on the insert element and thus in radial direction by means of the resilience of the elastomer components, but also to compensate for axial tolerances. With such elastomer components, the hole marginal region of an installation opening of the vehicle wheel between the supporting shoulder and the locking projection can be bordered due to the elastic properties of the supporting body under considerable pretensioning. This is provided in a preferred embodiment example. In such an embodiment example, the distance of the surface of the supporting shoulder, by which the supporting body is supported on the supporting surface of the vehicle wheel, from the radial locking projection of the supporting body is slightly smaller than the material thickness of a wheel-side installation opening which is passed through by the supporting body. This means that according to a first design, the supporting shoulder on the complementary supporting surface of the vehicle wheel and the locking projection bear under pretensioning against the rear side of the installation bore, so that the hole marginal region bordering the installation bore is clamped in between these two abutments—the supporting shoulder and the locking projection. Thereby, such an insert element is connected to the vehicle wheel with play-free and rattle-free seating.

Due to the above-described measure, the insert element is also successfully held with a pretensioning force on the wheel-side installation flange, which, on the one hand, replaces a screw pretensioning force and, on the other hand, also ensures a defined bearing of the insert element against the vehicle wheel outer side, for example, on the spoke flank. In this way, it can be achieved that a peripherally uniform slot distance between the insert element and the spoke flank can be set. The latter is promoted if, on the insert element and/or on the vehicle wheel-side, multiple web- or cap-like protrusions are provided as spacer elements. These spacer elements form an abutment for setting a pretensioning, with which the supporting bodies act with their locking projections against the surface of an installation opening of the vehicle wheel facing away from the insert element. For the application of this pretensioning force, use is made of the possible compression of the locking projection of the elastomer supporting bodies in axial direction, which are held on the respective supporting core by the retaining flange protruding thereon in radial direction.

The material thickness of the locking projection in axial direction is typically designed in such a manner that a sufficient pretensioning force can also be provided taking into consideration all the tolerance situations in axial direction with insertion of the insert element.

The elastomer properties of the supporting body in axial direction are used for the installation, and namely in that the locking projection of the supporting body can be pressed sufficiently far through the installation opening so that the locking projection engages behind the installation opening on its side facing away from the insert element. Likewise, during the installation, the locking projection is compressed in radial direction as it is passed through the installation opening, so that the elastomer properties of the supporting body in radial direction are also used during the installation. According to an additional design, an arrangement of spacers arranged in the contact region between the vehicle wheel and the insert element, which may be designed, for example, as web- or cap-like projections, is used as abutment for a fastening point in addition to the retaining flange. The pretensioning force then results from the elastic resilience of the locking projection of the supporting body of a fastening point. Thereby, in such a design as well, a pretensioning force acts on the connection between insert element and vehicle wheel. In an additional design of such an embodiment example, the spacers, and likewise bodies with elastomer properties, are arranged on the insert element.

In this way, independently of its design, the insert element can be clamped to the vehicle wheel in a manner similar to a screw connection. This ensures not only a secure fastening of the insert element on the vehicle wheel but also likewise a rattle-free seating, even when the vehicle wheel is exposed to dynamic stresses. In radial direction as well, the supporting body can act by its holding section located between the supporting shoulder and the locking projection under pretensioning against the installation opening wall. The same applies when spacer elements are provided, which act at least by a vector component in peripheral direction, for example, against a ventilation hole flank.

The supporting bodies are held in axial direction in a form-fitting manner on the respective supporting core by the retaining flange against being pulled off the supporting core. The retaining flange protruding from the supporting core in radial direction, which is harder in comparison to the supporting core, forms an abutment for the supporting body designed as elastomer component. If a pull-off force (loosening force) is exerted on the insert element, the rear-side marginal regions bordering the installation opening act against the locking projection of the supporting body. By the abutment of the supporting body on the retaining flange, such a loosening force brings about a compression of the locking projection in axial direction, resulting in the locking projection trying to expand in radial direction. The form-fitting connection acting in radial direction between the supporting body and the vehicle wheel or the installation opening through which the supporting body reaches is strengthened in this manner, so that in this way a loosening of the insert element from the vehicle wheel is not possible, at least not in a destruction-free manner. Such an insert element can be loosened from the vehicle wheel, if the locking projection of the elastomer support body is shorn off due to the applied loosening force. This too is not a problem in the end, since, in the case of a new installation of the insert element, only the elastomer supporting body needs to be exchanged. In order to achieve this locking between the supporting body sitting on the supporting core and the installation flange of the vehicle wheel, the surfaces in contact with one another in this regard in axial direction are arranged in a plane extending transversely to the longitudinal extension of the supporting body. In an embodiment example, these cooperating surfaces are located in a plane extending at a right angle with respect to the longitudinal axis of the supporting body or supporting core. The surfaces which in this regard cooperate can also be oriented inclined at a small angle with respect to the above-described planes, in particular also in a direction opposite the pull-off direction. In such a design, the rear-side peripheral edge of the installation opening promotes the shearing off of the locking projection when sufficiently high forces are applied. This can be advantageous when insert elements are to be replaced.

These supporting bodies designed as elastomer components sit with their hollow channel on a supporting core. In contrast to the supporting bodies, the supporting core is not an elastomer component. While the supporting bodies are produced, for example, from a soft plastic component, the supporting cores are produced, for example, from a hard plastic component. As material for producing the supporting body, a material having a Shore-A hardness of 55-85 is suitable. For this purpose, silicone material can be used, for example. When the supporting cores, which by comparison are considerably harder, are made of plastic, they are made, for example, of a polyamide (with or without fiber reinforcement). It is understood that the supporting cores can also be made of metal. The latter possibility exists when the insert elements are metal parts, since the supporting cores can then be connected by means of a material joint connection to the insert elements themselves. On the one hand, the supporting cores are used for holding the supporting bodies on the insert element. On the other hand, they are used as abutment for applying the above-described pretensioning. For this purpose, each supporting core has a retaining flange arranged on its free end or on its end region in this regard and which protrudes in radial direction. By the retaining flange, the supporting body is held in a form-fitting manner on the support core in axial direction against being pulled off from the supporting core. The free end of the supporting body is formed by the end of the locking projection. Thus, in such a design, the locking projection of the supporting body is supported on the retaining flange. Thereby, the retaining flange enables the locking surface of the locking projection, which bears against the rear side of the installation opening of the vehicle wheel, to bear with corresponding pretensioning against the rear-side hole marginal region of the installation bore under pretensioning. According to one design, the abutment opposite the retaining flange for such a supporting body designed as elastomer component is provided by the rear side of the insert element or one or more supporting elements attached on the rear side of the insert element, for example, supporting bars arranged in radial direction with respect to the supporting core. Other supporting elements can also be provided, for example, an abutment shoulder on which the base surface of the supporting shoulder of the supporting body is supported. In order to achieve the desired pretensioning, by which the hole marginal regions of the installation bore are clamped in between the supporting shoulder and the locking projection of such a supporting body, it is not necessary for the pretensioning force to be peripherally equal. If, as insert element-side abutment, for example, several supporting bars in a radial arrangement with respect to the supporting core are used, the base surface of the supporting shoulder is supported on small sides of these bars, so that a force concentration occurs in the region of the support of the supporting shoulder on the supporting bars. In alignment with these supporting bars, the supporting shoulder acts with higher pretensioning on the complementary supporting surface of the vehicle wheel than in the supporting shoulder regions located between the supporting bars. In such a design, depending on the height of the supporting shoulder, a certain evening out of the pretensioning force over the contact surface of the supporting shoulder occurs on the complementary supporting surface of the vehicle wheel. Nevertheless, the advantages of an abutment element designed, for example, as supporting bars remain noticeable.

In one design, the supporting shoulder is designed as hollow chamber component which has several hollow chambers separated by a respective web extending in radial direction. In such a design, contact tolerances can be compensated in a special way, for example, if, as a result of production, the supporting surface of the vehicle wheel is not exactly parallel to the complementary surface of the supporting shoulder. Such compensation is in principle also possible with a solidly designed shoulder of the support body, but in this regard a supporting shoulder designed as a hollow chamber component enables a better compensation while ensuring the most peripherally uniform possible pretensioning acting on the supporting surface of the vehicle wheel. The hollow chambers can be open in direction of the rear side of the insert element, which simplifies the production of the supporting shoulder.

Such a supporting body designed as elastomer component is typically produced as an injection molded part but it can also be produced using additive or other manufacturing methods.

The pretensioning acting on the hole marginal regions of the installation opening of the vehicle wheel is achieved in that the distance of the locking surface of the locking projection from the surface of the supporting projection facing the supporting surface of the vehicle wheel is smaller in the untensioned state than the material thickness of the vehicle wheel in the region of its installation openings. The elasticity of the supporting shoulder of such a supporting body can also be used so that the locking projection of the support body can be pressed sufficiently far through an installation opening of the vehicle wheel so that this locking projection of reduced diameter within the installation bore automatically relaxes on the rear side of the installation opening in order to engage behind it, even if, during the installation process, the locking projection as a whole or in certain sections has been elastically shifted in the direction of the supporting shoulder.

In another design, the locking projection is supported by means of its locking surface under pretensioning on the rear side of the installation opening, wherein the counter-abutment is due to the contact arrangement between the insert element and the vehicle wheel occurring via spacer elements. These spacer elements are located in the region of the outer periphery on the side of such an insert element, which is not visible from the visible outward-facing side.

For the application of increased pretensioning in axial direction on the hole marginal regions of the installation bore, it can be provided that the locking surface of the supporting projection of the supporting body does not extend parallel to the contact surface of the vehicle wheel, at least in its inner region, but instead extends inclined with respect to said contact surface. By such a measure, the shape stability of the locking projection with respect to a shift in the direction of the supporting shoulder is increased. In addition, an increased pretensioning then acts on the junction between the wall of the installation bore and the surface regions bordering said installation bore. Such a measure can also be undertaken for adapting to the geometry of the installation opening, for example, if a bevel is provided on the rear side of the installation opening.

The supporting core can be designed as slotted or not slotted, wherein such a slot for the formation of a gap extends in longitudinal axial direction. If the supporting core is slotted, wherein the supporting core is typically divided into two supporting core segments in such a design, the core segments can be shifted in radial direction with their retaining flange, in particular toward one another for reducing the diameter of the retaining flange. In such a slotted design of the supporting core, the maximum diameter of the retaining flange can therefore be greater than the diameter of the installation opening. In transverse direction with respect to the extension of the maximum diameter of the retaining flange, on the other hand, the diameter is not greater than the diameter of the installation opening. The abutment formed by the retaining flange in such a design engages behind the installation opening. To achieve a pull-off protection, it can be provided to insert a securing pin in the gap separating the two supporting core segments, so that a movement of the supporting core segments in radial direction toward one another, whereby the diameter in the region of the retaining flange would be reduced, is blocked. Such a securing pin, as provided in an embodiment example, can be preinstalled in a manner so that it can be shifted in longitudinal axial direction on the supporting core. In such a design, the securing pin has, for example, guiding pins which engage in the gaps separating the supporting core segments. According to one design, such a securing pin has sections with different diameters. In the region of its head or in the region forming such a head, a blocking section is located which engages between the two supporting core segments for blocking the above-described diameter reduction movements. A section formed thereon has a smaller diameter so that, when this section is located in the region of the retaining flange, the supporting core segments can be shifted towards one another. During the installation and the removal of the insert element on the vehicle wheel or from the vehicle wheel, the securing element is in this position. After an installation, the securing pin is then inserted into the gap in order to block a loosening movement.

In another design, the supporting core is not slotted. In such a design, the diameter of the locking projection of the supporting body designed as elastomer component is greater than the diameter of the retaining flange and of the installation opening. In this design, the diameter of the retaining flange is smaller than the diameter of the installation opening of the vehicle wheel, so that said retaining flange can pass through the installation opening without problem. In the same way as described in the previous embodiment example, the front side of the locking projection is supported on the retaining flange.

In a preferred design, the supporting body sits by means of its hollow channel wall under pretensioning on the supporting core. By this measure, the fastening seating is improved. In addition, this measure promotes a rattle-free seating of the insert element on the vehicle wheel.

BRIEF DESCRIPTION OF THE DRAWINGS

The below description is provided in reference to the appended figures based on embodiment examples, wherein:

FIG. 3 shows an enlarged view of a fastening point of FIG. 2 by which the insert element is fastened on the vehicle wheel;

FIG. 4 shows an isolated view of a supporting core formed on the rear side of the insert element of FIG. 3;

FIG. 5a shows a side view of a supporting body which sits on the supporting core of FIG. 4;

FIG. 5b shows a perspective view of the supporting body of FIG. 5a with a view onto its base surface;

DETAILED DESCRIPTION

Figure 1:
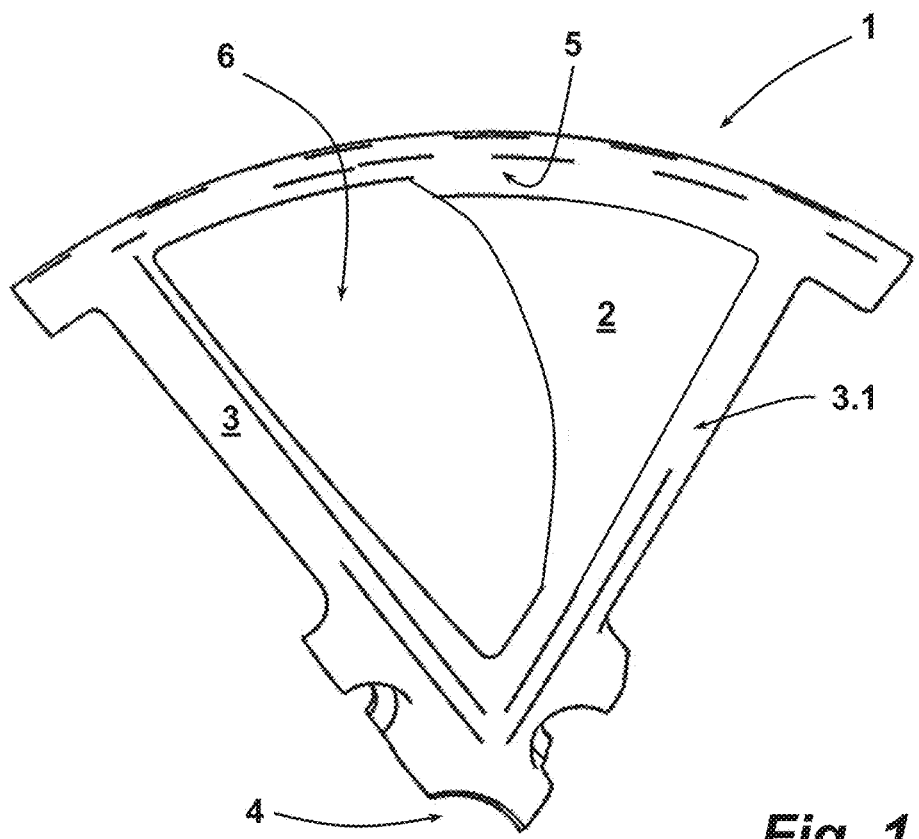
FIG. 1 shows a top view of a vehicle wheel segment with an insert element which partially covers a wheel opening and is mounted on the vehicle wheel.

In FIG. 1, a vehicle wheel 1 with only one segment is shown. The light-metal vehicle wheel 1 made of an aluminum alloy has several wheel openings 2 arranged distributed in peripheral direction. Each wheel opening 2 is delimited by two spokes 3, 3.1 in peripheral direction. In radial direction, the wheel opening 2 is delimited by the side of the rim well 5 facing the hub region 4. The wheel opening 2 is partially covered by an insert element 6 designed as a plastic part in the embodiment example shown. The remaining residual opening of the wheel opening 2 is used for supplying air during a rotation of the wheel 1 to a brake disk arranged on the wheel inner side. In addition to design-related aspects, the insert element 6 is used simultaneously for the defined supply of air through the remaining residual opening of the wheel opening 2.

Figure 2:
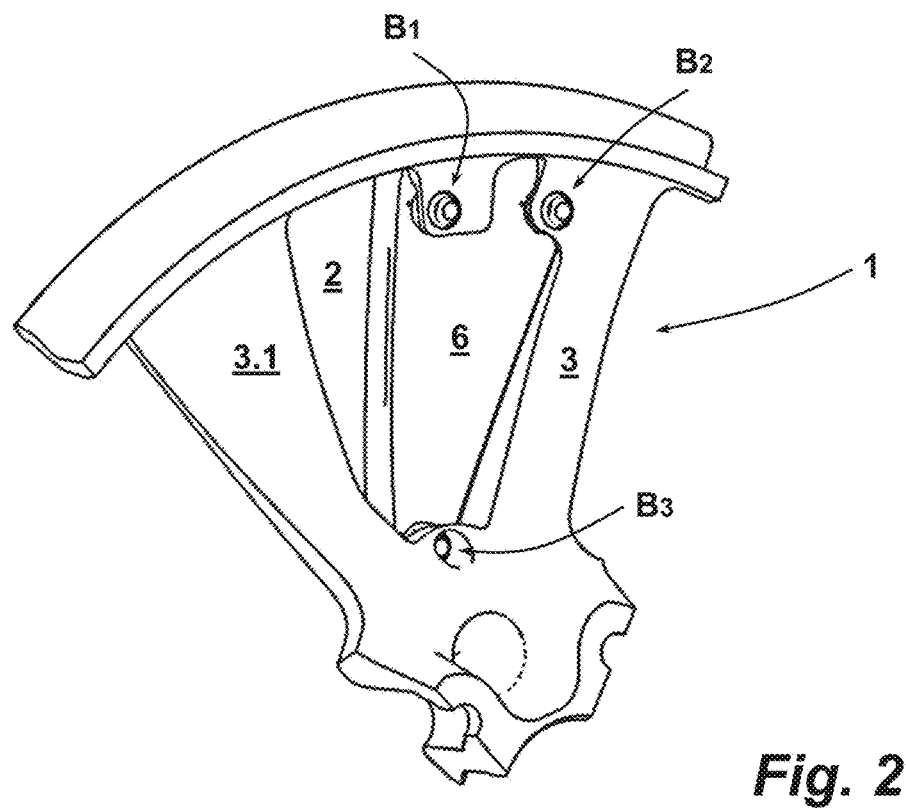
FIG. 2 shows a rear view of the vehicle wheel segment of FIG. 1.

In the embodiment example shown, the fastening of the insert element 6 occurs via three fastening points, wherein an installation of the insert element 6 on the vehicle wheel 1 occurs without a tool. The fastening points can be seen in the rear view of the vehicle wheel 1 of FIG. 2 and are identified therein with reference numerals $B_1$, $B_2$ and $B_3$. The fastening of the insert element 6 on the vehicle wheel 1 is explained in greater detail below based on fastening point $B_1$. These explanations apply equally to fastening points $B_2$ and $B_3$.

The fastening point $B_1$ shown in an enlarged perspective representation in FIG. 3 is designed as follows. The vehicle wheel 1 has an installation flange 7. The rear side of the flange 7, which cannot be seen in FIG. 3, forms a supporting surface. In the installation flange 7, an installation opening 7.5 designed as an installation bore is introduced (see FIGS. 6 and 10). It is not visible in FIG. 3, since a supporting body 9 sitting on a supporting core 8 engages in it and reaches with parts through the installation bore. As can be seen in FIG. 4, the supporting core 8 is formed on the rear side of the insert element 6 and therefore made of the same hard plastic component as the insert element 6 itself. In the embodiment example shown, the insert element 6 with its supporting core 8 is made of a polyamide material. In the embodiment example shown, the supporting core 8 is a pipe length which bears a retaining flange 10 at its free end away from the rear side of the insert element 6. The retaining flange 10 protrudes beyond the diameter of an annular cylindrical shaft section 11, and therefore has a greater diameter than the diameter of the shaft section 11. The maximum diameter of lateral surface 10.5 of the retaining flange 10 is smaller by a necessary installation clearance than the diameter of the installation bore 7.5 reaching through the installation flange 7 (see FIG. 6). In the region of the connection of the shaft section 11 of the supporting core 8 to the rear side of the insert element 6, several supporting bars 12, four in the embodiment example shown, are located arranged radially with respect to the shaft section 11. Said supporting bars are formed on the rear side of the insert element 6 on the shaft section 11. With their narrow sides according to the longitudinal extension, said supporting bars face the retaining flange 10.

The supporting body 9 sits on the supporting core 8. For this purpose, the supporting body 9 has a hollow channel 10a (see FIG. 5b). The supporting body 9 is an elastomer component, and therefore has a clearly lower hardness than the material of the supporting core 8. The supporting body 9 is made of a soft plastic and namely, in the embodiment example shown, of a silicone material having a Shore-A hardness of 65. Because of its elastic properties, the supporting body 9 can be shifted without problem over the retaining flange 10 of the supporting core onto the shaft section 11.

The supporting body 9 has a supporting shoulder 13 which bears with its base surface 14 against the small sides of the supporting bars 12, which face the retaining flange 10. The surface of the supporting shoulder 13 opposite the base surface 14 is a contact surface 15, against which the hole marginal region of the installation hole, which faces the insert element 6, bears as complementary supporting surface. A holding section 16 is formed on the supporting shoulder 13. The diameter of the holding section 16 substantially corresponds to the diameter of the installation bore. On the holding section 16, a locking projection 17 which is peripheral in the embodiment example shown is formed with a locking surface 18 facing the contact surface 15. The locking projection 17 protrudes beyond the holding section 16. The supporting body 9 is tapered by the holding section 16. The holding section 16 and the locking projection 17 together form a fastening extension. As can be seen in FIGS. 3 and 5a, the side of the locking projection 17, which faces away from the supporting shoulder 13, is in the form of a truncated cone 17.5. The truncated cone shape transitions into an identical truncated cone shape of the retaining flange 10 (see also FIG. 3 and fastening point $B_2$ in FIG. 6).

In the embodiment example shown, the supporting shoulder 13 is designed as hollow chamber part and has several hollow chambers 19 arranged peripherally distributed. Two adjacent hollow chambers 19 are each separated from one another by a web 20 extending in radial direction.

Figure 6:
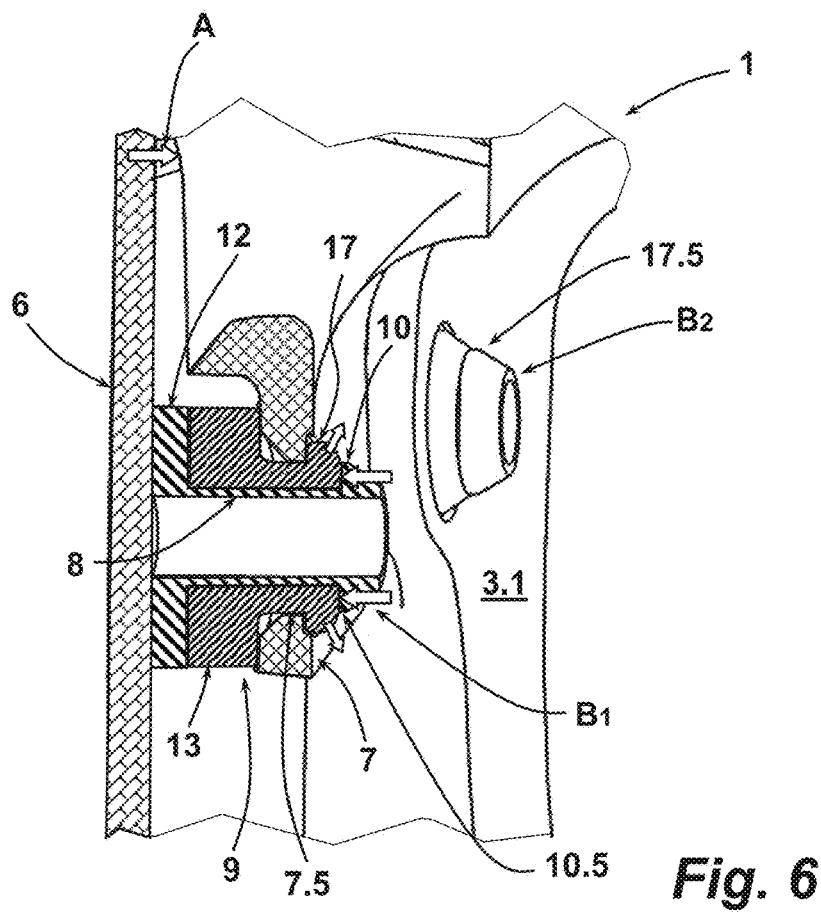
FIG. 6 shows a cross-sectional view through the fastening point of FIG. 3, with the cutting line in radial direction with respect to the hub of the vehicle wheel.

The fastening point $B_1$ is shown in cross section in FIG. 6. The supporting body 9 sits on the shaft section 11 of the supporting core 8. The tapered front side of the locking projection 17 is supported on the side of the retaining flange 10 which faces the insert element 6. In this way, the supporting body 9 is held in axial direction in a form-fitting and force-fitting manner on the supporting core 8. In this embodiment example, the base surface 14 of the supporting shoulder 13 is supported on the supporting bars 12. The support of the supporting body 9 via its base surface 14 on the support bars 12 of the supporting core 8—on the one hand—and with the front side of its locking projection 17 on the retaining flange 10 of the supporting core 8—on the other hand—is under a certain pretension. The hole marginal region of the installation bore reaching through the installation flange 7 is accommodated in the holding section 16 of the supporting body 9. The axial extension of the holding section 16 of the supporting body 9 is slightly smaller than the material thickness of the installation flange 7, so that the hole marginal region of the installation bore is clamped in between the contact surface 15 of the supporting shoulder 13 and the locking surface 18 of the locking projection 17. In this way, a secure fastening, which is under pretensioning, of the fastening points $B_1$ to $B_3$ of the insert element 6 on the vehicle wheel 1 is ensured.

In FIG. 6, as an example, a spacer element A is formed on the inner side of the insert element 6. Said spacer element is designed in the manner of a cap. The insert element 6 is supported on the outwardly facing side of the vehicle wheel 1 by the spacer element A. The spacer element A is located in the immediate vicinity with respect to the peripheral end of the insert element 6. The insert element 6 bears several spacer elements A arranged at a distance from one another for supporting the insert element 6 on the outer side of the vehicle wheel 1. This supporting is used to provide a uniform joint gap or a uniform clearance between the insert element 6 and the visible side of the vehicle wheel 1. The supporting of the insert element 6 by means of the spacer element A on the side of the vehicle wheel 1 facing the insert element 6 at the same time represents an abutment to provide, with the elastomer supporting bodies 9 sitting on the supporting cores 8 or their locking projections 17 which are elastically compressible in axial direction, a pretensioning which ensures a play-free and rattle-free seating of the insert element 6 on the vehicle wheel 1. The axial length of the supporting body 9 and in particular of its locking projection 17 and the design of the supporting core 8 with its retaining flange 10 are adjusted with respect to one another so that, when the insert element 6 is mounted on the vehicle wheel 1, the locking projection 17 is compressed in axial direction. The radial expansion of the locking projection 17 is indicated by block arrows in FIG. 6. The restoring force resulting from the elastic compression of the locking projection 17 in axial direction uses as abutment the bearing surface protruding radially with the retaining flange 10—on the one hand—and the support of the insert element 6 via its spacer elements A on the outside on the vehicle wheel 1—on the other hand—whereby the locking projection 17 acts against the surface of the installation flange 7 which faces away from the insert element 6 in its region bordering the installation opening. At the same time, the insert element 6 is supported via the spacer elements A on the outside on the vehicle wheel 1. In FIG. 6, the above-described supporting on the abutments—the retaining flange 10 and the vehicle wheel outer side—is identified by block arrows.

In a further development, it is provided that the supporting body 9 with its base surface 14, when attached to the installation flange 7 of the vehicle wheel 1, is not supported on the supporting bars 12, but it is provided that, in order to apply the desired pretensioning force, the abutment occurs due to the contact arrangement of the spacer elements A on the outer side of the vehicle wheel 1. In this design, a certain play is present between the base surface 14 of the supporting shoulder 13 of the supporting body 9 and the supporting bars 12. Thus, in this design, for applying the desired pretensioning, the retaining flange 10—on the one hand—and the contact arrangement of the supporting elements A on the outer side of the vehicle wheel 1—on the other hand—act as abutment. It is understood that the spacer elements can also be arranged on the vehicle wheel side.

Figure 7:
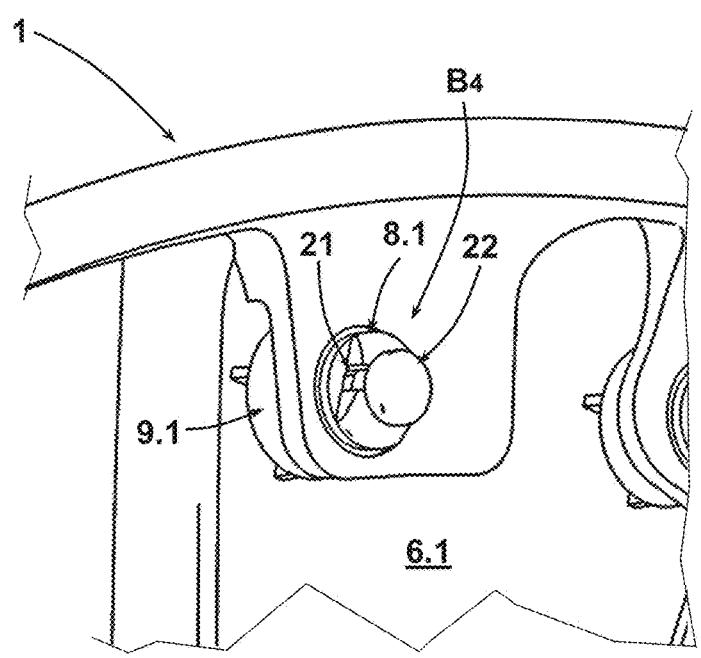
FIG. 7 shows a fastening point for fastening an insert element according to a design with securing pin on a vehicle wheel in a view corresponding to that of FIG. 3.
Figure 8:
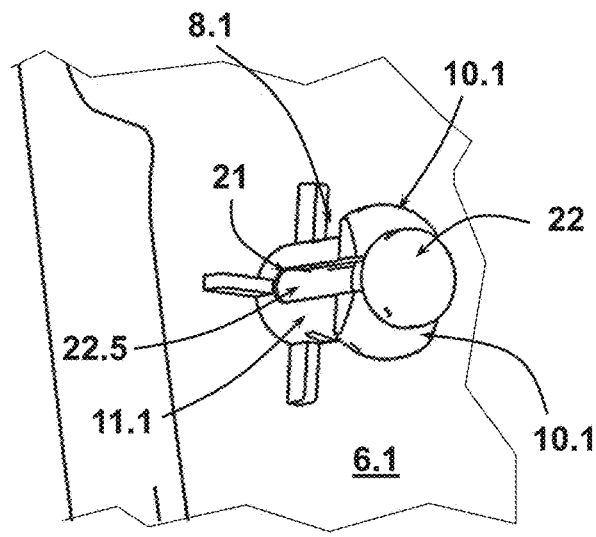
FIG. 8 shows an isolated view of a supporting core formed on the rear side of the insert element of FIG. 7 with the securing pin.
Figure 9:
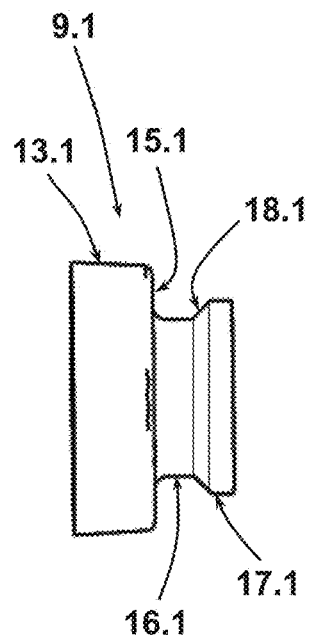
FIG. 9 shows a side view of a supporting body which sits on the supporting core of FIG. 8.

FIG. 7 shows an additional embodiment example of a fastening point $B_4$ for fastening an additional insert element 6.1 on the vehicle wheel 1. The insert element 6.1 is in principle constructed in exactly the same way as the above-described insert element 6. Therefore, the explanations in this regard also apply to the insert element 6.1. In FIG. 7, one fastening point $B_4$ of three fastening points is shown, as also described with regard to the insert element 6 of the preceding figures. In principle, the fastening point $B_4$ is constructed like the above-described fastening point $B_1$ of the insert element 6. The fastening point $B_4$ differs from the above-described fastening point $B_1$ in that the supporting core 8.1 is designed slotted with two gaps 21 lying opposite one another with respect to the longitudinal axis, of which only one of the two gaps 21 can be seen in the figures. The supporting core 8.1 has an inner channel, in which a securing pin 22 engages and is guided therein in axial direction. For the guiding, guiding pins 22.5 which engage in the gaps 21 are used. In this embodiment example, on the shaft section 11.1 of the supporting core 8.1, a retaining flange 10.1 is formed on each of the two supporting core half-shells. A supporting body 9.1 designed as elastomer component sits on the shaft section 11.1. Said supporting body 9.1 is shown in a side view in FIG. 9. The supporting body 9.1 also has a supporting shoulder 13.1 with a contact surface 15.1 and with an opposite locking surface 18.1 which protrudes beyond the holding section 16.1. The locking surface 18.1 is inclined.

Figure 10:
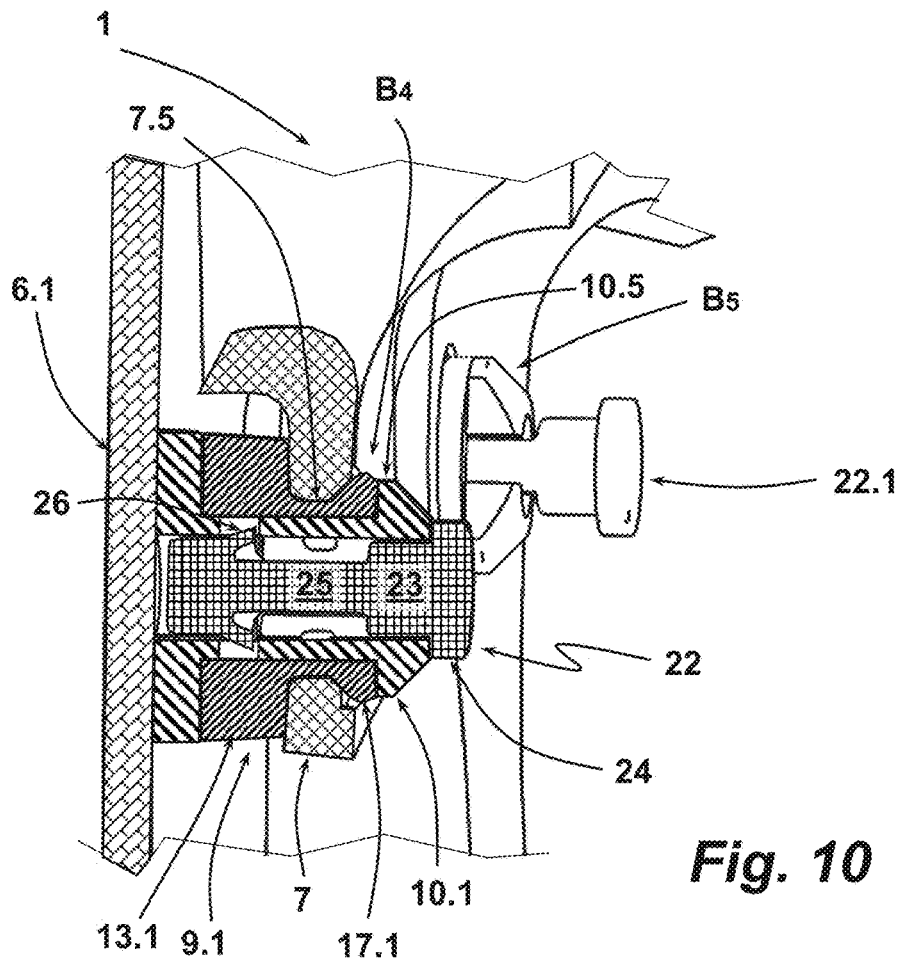
FIG. 10 shows a cross-sectional view through the fastening point of FIG. 7, with the cutting line in radial direction with respect to the hub of the vehicle wheel.

The maximum diameter of the supporting core 8.1 in the region of its retaining flange 10.1, provided by the lateral surface 10.5 of the retaining flange 10.1, is greater than the diameter of the installation bore 7.5 reaching through the installation flange 7 (see FIG. 10). Therefore, the retaining flange 10.1 engages behind the installation bore of the vehicle wheel 1. The diameter of the locking projection 17.1 forming the locking surface 18.1 of the supporting body 9.1 corresponds to the maximum diameter of the retaining flange 10.1.

FIG. 10 shows the fastening point $B_4$ and the adjacent fastening point $B_5$ located in a perspective view behind it, in a cross-sectional representation. While the fastening point $B_4$ is shown in a position of the securing pin 22 which prevents a shifting movement of the two supporting core segments or supporting core half-shells in the region of their retaining flange 10.1 toward one another, the securing pin 22.1 at fastening point $B_5$ is in an installation position. The securing pins 22, 22.1 have the same design. Below, the securing pin 22 is described. The same explanations likewise apply also to the securing pin 22.1.

The securing pin 22 has a blocking section 23, the outer diameter of which corresponds to the inner diameter of the inner channel of the supporting body 8.1. On the blocking section 23, a head 24 is formed for handling the securing pin 22. In the direction of the insert element 6.1, on the blocking section 23, a section 25 with reduced diameter is formed. If the section 25 is located in the region of the retaining flange 10.1, as is the case at fastening point $B_5$, the two supporting core half-shells can be moved toward one another in the region of their retaining flange 10.1. Then it is possible to bring them through the installation bore. In the securing position of the securing pin 22, shown in FIG. 10 with regard to the fastening point $B_4$, this position is additionally secured by a catch mechanism in the lower region of the securing pin 22 with respect to the supporting core 8.1. For this purpose, two small snap arms 26 are used, which lie opposite one another with respect to the longitudinal axis of the securing pin 22 and which engage in complementary openings or perforations in the supporting core 8.1. In the installation position with securing pin 22, 22.1 pulled out as shown at fastening point $B_5$, these small snap arms 26 bear against the inner wall of the channel of the supporting core 8.1. When the insert element 6.1 with its fastening points is mounted on the vehicle wheel 1, the securing pins 22, 22.1 are inserted. This at the same time represents a visual inspection control for a connection according to intended use of one or more insert elements 6.1 on the vehicle wheel 1.

In the embodiment example of FIGS. 7 to 10, the insert element 6.1 is supported via spacer elements on the outward facing side of the vehicle wheel 1, in the same manner as described with regard to the embodiment example of FIGS. 1 to 6. With regard to the application of a pretensioning force on the insert element 6.1 connected to the vehicle wheel 1, the same explanations apply as described with regard to the embodiment example of FIGS. 1 to 6 for the supporting body 9.1 with its locking projection 17.1. The bulge brought about due to the compression of the locking projection 17.1 in axial direction is indicated in FIG. 10.

From this disclosure it becomes clear that not only can an insert element as described be mounted particularly simply, but also advantageous properties of a conventional screw connection can be implemented.

The invention has been described using embodiment examples. Without departing the scope of the claims, numerous embodiments, modifications and possibilities for implementing said invention arise for a person skilled in the art, without needing to explain or show them in further detail in the context of this disclosure.

LIST OF REFERENCE NUMERALS

1 Vehicle wheel
2 Wheel opening
3, 3.1 Spoke
4 Hub region
5 Rim well
6, 6.1 Insert element
7, 7.1 Installation flange
7.5 Installation opening of vehicle wheel
8, 8.1 Supporting core
9, 9.1 Supporting body
10, 10.1 Retaining flange
10.5 Lateral surface of retaining flange
10a Hollow channel
11, 11.1 Shaft section
12 Supporting bar
13, 13.1 Supporting shoulder 14 Base surface
15, 15.1 Contact surface
16, 16.1 Holding section
17, 17.1 Locking projection
17.5 Truncated cone shape
18, 18.1 Locking surface
19 Hollow chamber
20 Web
21 Gap
22, 22.1 Securing pin
22.5 Guiding pin
23 Blocking section
24 Head
25 Section
26 Small snap arms
A Spacer element
$B_1$-$B_5$ Fastening point

The invention claimed is:

1. An insert element for a vehicle wheel, the insert element having a front side being an axially outboard side and a rear side being an axially inboard side, comprising:
  a plurality of supporting bodies arranged at a distance from one another on the rear side on the insert element for supporting and holding the insert element on supporting surfaces of the vehicle wheel, wherein the supporting bodies each have a supporting shoulder for bearing against a supporting surface of the vehicle wheel, and a fastening extension with an axial hollow channel and with at least one outwardly protruding locking projection arranged at an axial distance from the supporting shoulder for engaging axially inboard of an installation opening extending through the supporting surface of the vehicle wheel, wherein the supporting bodies are designed as elastomer components which are elastically deformable in a radial direction and an axial direction, and
  a plurality of supporting cores which each have a radially protruding retaining flange and are held on the rear side on the insert element, wherein the supporting bodies with their hollow channels each sit on a supporting core, and each supporting body is held in a form-fitting manner by the retaining flange of the supporting core bearing the supporting body in the axial direction against being pulled off from the supporting core.

2. The insert element of claim 1, wherein the locking projection of the supporting body protrudes in the radial direction with respect to the retaining flange of the supporting core.

3. The insert element of claim 2, wherein the diameter of a lateral surface of the retaining flange of the supporting core is smaller than the diameter of the installation opening of the vehicle wheel which is to be reached through.

4. The insert element of claim 1, wherein the diameter of a lateral surface of the retaining flange of the supporting core is greater than the diameter of the installation opening of the vehicle wheel which is to be reached through, and the supporting core, starting from the retaining flange thereof, has at least one gap following a longitudinal extension of the support core with a gap width, such that, as a result of a diameter reduction of the retaining flange made possible by the gap, the retaining flange is insertable through the installation opening of the vehicle wheel.

5. The insert element of claim 4, wherein the supporting core is formed by at least two supporting core segments which are spaced from one another by a respective gap.

6. The insert element of claim 5, further comprising a securing element, wherein the securing element is arranged between the supporting core segments for blocking the diameter reduction of the retaining flange after connection of the insert element on the vehicle wheel.

7. The insert element of claim 6, wherein the supporting core segments are half-shells and the securing element is a securing pin, wherein the securing pin has a blocking section of larger diameter on which a guiding section of smaller diameter is formed, wherein the securing pin is movable in the axial direction in a channel formed by the two supporting core half-shells, wherein, in a securing position, the blocking section of the securing pin engages in the channel and, in a non-securing position, the blocking section of the securing pin does not engage in the channel, such that the two half-shells are adjustable with respect to one another for the diameter reduction of the retaining flange in the non-securing position.

8. The insert element of claim 7, wherein the securing pin has guiding pins which engage in each gap separating the supporting core half-shells.

9. The insert element of claim 4, wherein the retaining flange of the supporting core and the locking projection of the supporting body have an axially inboard side designed as a truncated cone.

10. The insert element of claim 1, wherein the locking projection, on a side thereof facing the supporting shoulder, has a locking surface designed as inclined.

11. The insert element of claim 1, wherein the supporting shoulder is a hollow chamber structure with a plurality of hollow chambers separated from one another in a circumferential direction by respective webs extending in the radial direction.

12. The insert element of claim 1, wherein, in a region of the supporting core connected to the insert element, a plurality of supporting bars are arranged with an angular distance from one another around the supporting core, and the supporting bars extend radially from the supporting core.

13. The insert element of claim 12, wherein the supporting bars are formed both on the supporting core and on the rear side of the insert element.

14. The insert element of claim 1, wherein, for supporting the insert element at contact regions between the vehicle wheel and the insert element, a plurality of projections as spacer elements are located on the insert element side and/or the vehicle wheel, and wherein the insert element is in contact with the spacer elements in the axial direction and/or in the radial direction of the supporting cores and this contact provides, in addition to the retaining flanges of the supporting cores, abutment for pretensioning.

15. A vehicle wheel having a plurality of openings with at least one insert element connected to the vehicle wheel, wherein the at least one insert element is an insert element according to claim 1.

16. The vehicle wheel of claim 15, wherein the vehicle wheel openings are delimited in a circumferential direction of the vehicle wheel by one or more spokes.

17. The vehicle wheel of claim 15, wherein the vehicle wheel is a light metal wheel.

* * * * *